Nov. 24, 1931.  J. L. BUCKLEY  1,833,203
ARBOR HUB
Filed May 15, 1930  2 Sheets-Sheet 2
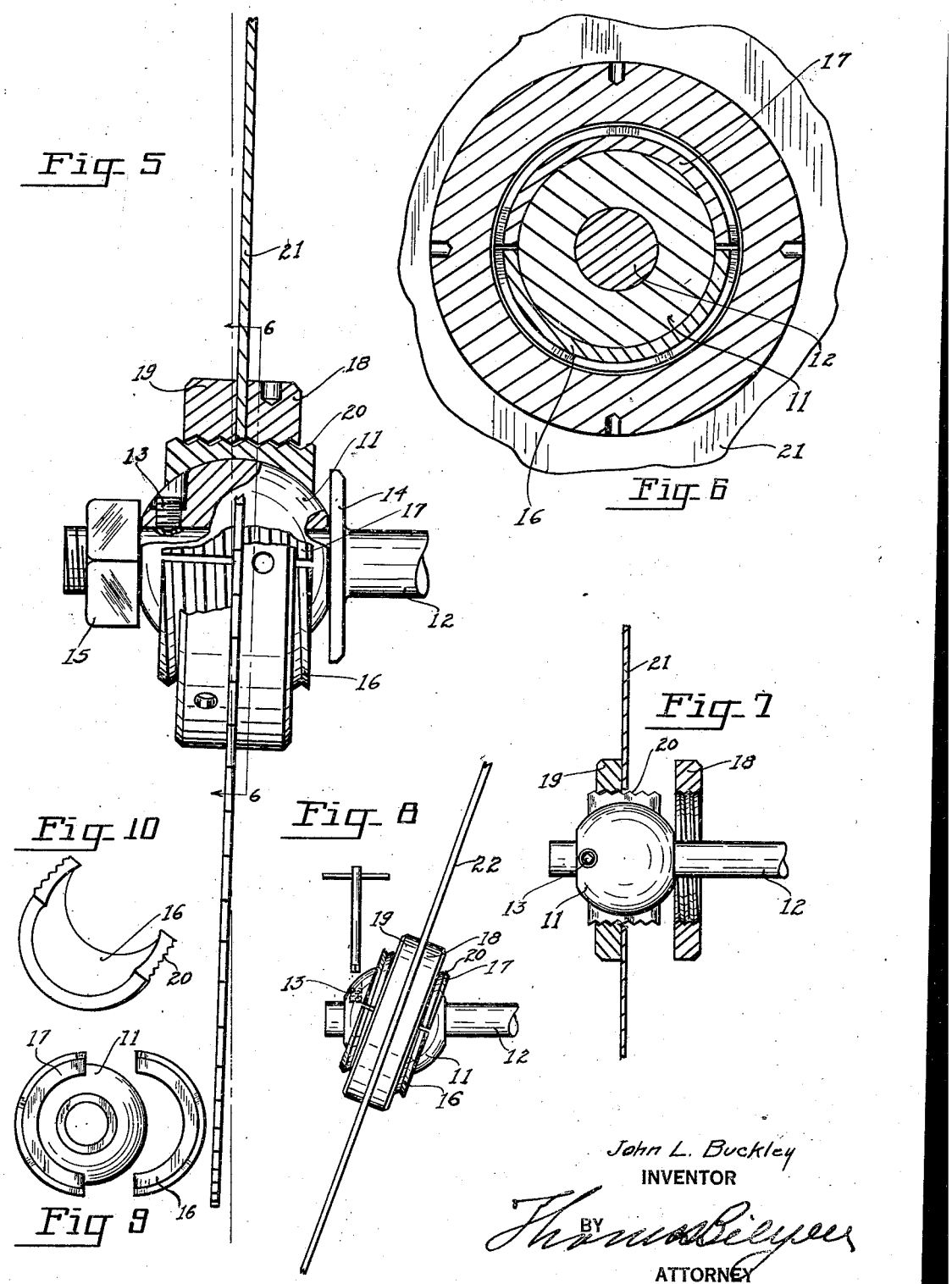
John L. Buckley
INVENTOR
ATTORNEY Patented Nov. 24, 1931

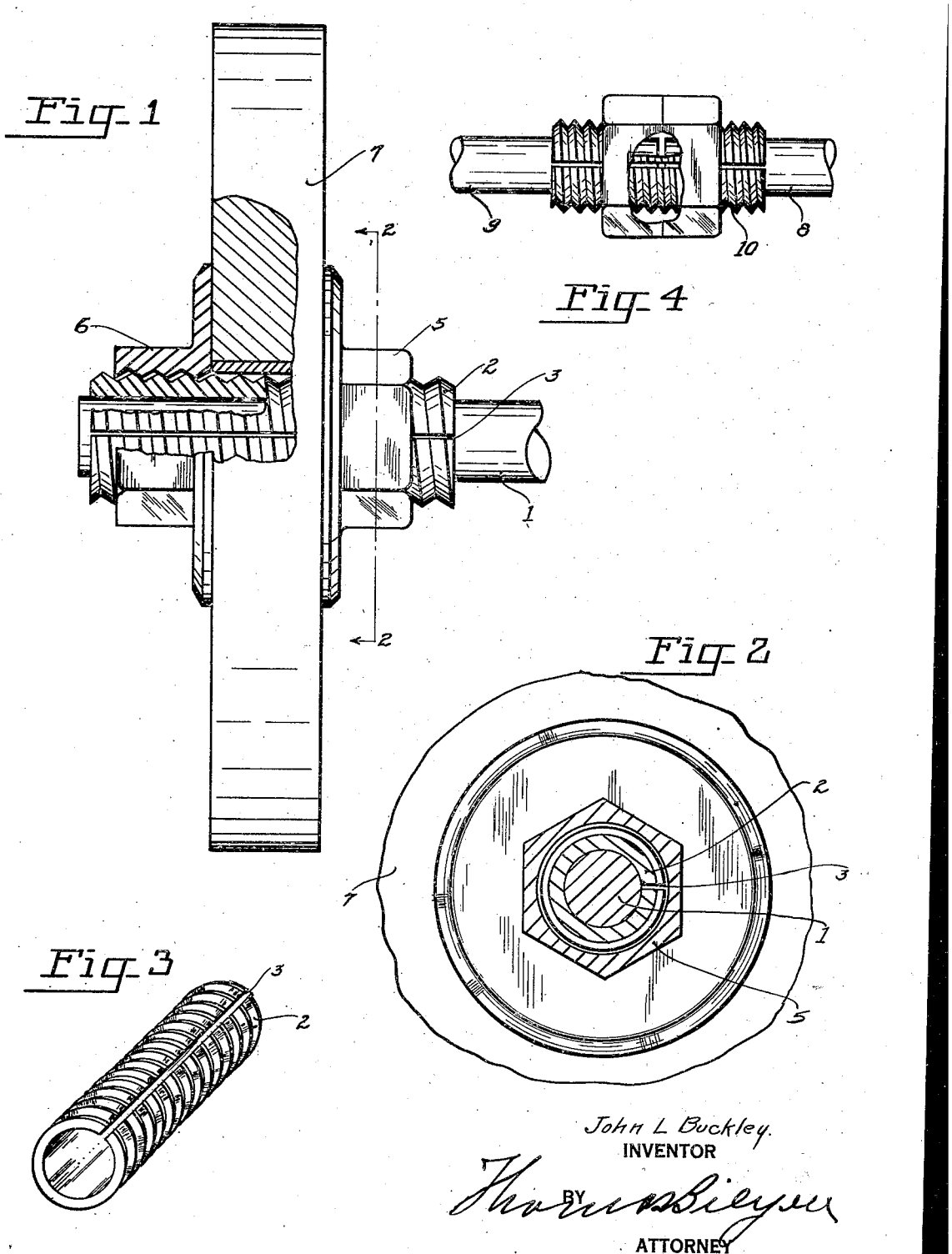

1,833,203

UNITED STATES PATENT OFFICE

JOHN L. BUCKLEY, OF PORTLAND, OREGON

ARBOR HUB

Application filed May 15, 1930. Serial No. 452,698.

My invention relates to a device placeable upon a shaft or other cylindrical object upon which grinding wheels, saws, pulleys and any and all objects to be rotated by the shaft may be mounted.

The invention in its preferred embodiment consists of a split member threaded upon its outer peripheral surface upon which clamping collars may be mounted, the object of which is to clamp the split member upon the cylindrical member and to simultaneously and fixedly position the object to be rotated between the clamping members.

My invention is intended for use in factories, machine shops and in any and all places where it may be found desirable to clamp, or fixedly position, articles to be rotated upon a shaft already installed and without the dismantling of the shaft and the removal of hangers, pulleys and the like to facilitate the placing of the device thereupon.

The device may be used as a splicing sleeve for connecting the ends of shafts or other objects together and to place the same in position to be rotated by the shaft that is already in place.

The device may be utilized, in a modified form, for the mounting of saw collars thereupon to maintain a wobble saw thereupon to cut a kerf, the width of which, may be precisely determined by the location of the collar and the sleeve.

A further object of my invention consists in providing a relatively cheap article of manufacture for use as a clamping means for the positioning of saws, grinding wheels and the like in place, upon arbors, shafts and upon other cylindrical objects.

A still further object of my invention consists in providing simple and efficient means comprised of a limited number of parts and one that may be accurately and cheaply finished for the purpose intended and that may be placed in position utilizing a minimum of time in doing so.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a plan view, partially in section, of the assembled device.

Fig. 2 is a sectional, side view of the assembled device, the same being taken on line 2—2 of Fig. 1 looking in the direction indicated.

Fig. 3 is a perspective, end view of the split sleeve made of a single piece.

Fig. 4 is a side view, partially in section of one of the devices used as a splice for the securing of shafts together.

Fig. 5 is a sectional, side view of a modified form of device upon which a saw may be mounted.

Fig. 6 is a sectional, end view of the mechanism illustrated in Fig. 5, the same being taken on line 6—6 of Fig. 5 looking in the direction indicated.

Fig. 7 is a sectional, side view of the mechanism illustrated in Figs. 5 and 6 and illustrating the saw mounted thereupon with one of the fastening collars removed from the split sleeve that is shown as being mounted upon a spherical support.

Fig. 8 is a side view of the mechanism illustrated in Fig. 7 and illustrating the saw mounted thereupon in position to be used as a wobble saw and illustrating the means for attaching the spherical bearing to the shaft.

Fig. 9 is an end view of the spherical support mounted upon a shaft and illustrating the split sleeves that are placeable upon the spherical support.

Fig. 10 is a fragmentary, sectional, end view of a portion of the mechanism illustrated in Fig. 9.

Like reference characters refer to like parts throughout the several views.

My invention is primarily intended for placement upon a shaft 1. In its simplest form the device consists of a split sleeve 2 that is formed upon its inner diameter to substantially fit about the shaft 1. The fit is so precise upon the shaft that the sleeve will slide freely upon the shaft 1 when not clamped. But by compressing the sleeves so as to decrease the width of the slit 3 that runs longitudinally of one side of the sleeve the same may be clamped upon the shaft 1.

The sleeve is threaded upon its outer peripheral surface as illustrated at 4 with the threads being relatively coarse. Threaded collars 5 and 6 are placeable upon the sleeve and are adapted for being threadably positioned thereupon. The internal thread disposed upon the inner surface of the collars 5 and 6 is also relatively coarse, having a uniform pitch with that of the thread 4 disposed upon the split sleeve 2.

Any article may be mounted upon the sleeve and between the respective collars, as a grinding wheel 7. When pressure is applied upon the respective threaded collars 5 and 6 until a pressure develops upon the article to be clamped therebetween as a grinding wheel 7, the sloping surface of the internal thread of the threaded collars has a tendency to climb the thread upon which the same is mounted and to thereby compress the split sleeve 2 upon the shaft 1.

The device may be used in the clamping of two shaft ends 8 and 9 together by the threaded flanges being made to engage each other and to compress the split sleeve 10 about the respective ends of the shaft.

For certain characters of work and for certain purposes it may be found desirable to place a spherical support 11 upon an arbor or shaft 12. The spherical support is secured to the shaft by any suitable fastening means as by a stud 13 being placed within the spherical member the inner end of which rests upon the shaft or arbor upon which the same is mounted. A collar 14 may be placed upon the arbor and a nut 15 be threaded to one end of the arbor and the spherical support being clamped between the collar and the nut. A stud 13 is provided to prevent the rotation of the shaft on the arbor upon which the same is mounted. In this form of construction the split sleeve may be comprised of two or more independent sections 16 and 17, the inner surface of each of the sections being adapted to precisely engage upon the outer surface of the spherical member. The sleeve members may be placed in position upon the spherical member and the threaded collars 18 and 19 be threadably disposed upon the relatively coarse thread 20 that is formed upon the outer surface of the split sleeves. The device to be clamped therebetween, as a saw 21, may be positioned at right angles to the shaft 12, or at any desired angle relative thereto, as is illustrated in Fig. 8, with the element being mounted thereupon as a saw 22, being so positioned as to form a wobble saw mounted upon the spherical member.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, in combination with a shaft, a spherical member fixedly secured to the shaft, a plurality of sleeve sections disposed about the spherical member and adapted to precisely fit the outer surface of the spherical member, said sections having a relatively coarse thread disposed upon their outer peripheral surface and which form, when together, a completed threaded surface, collars threadable about the sleeve sections, said collars when threaded upon the sleeve sections adapted to compress the sections upon the spherical member and to maintain said sleeve in fixed relation to the spherical member when so compressed.

2. In a device of the class described, in combination with a shaft, a spherical bearing disposed about the shaft, means for fixedly maintaining the spherical member upon the shaft, a plurality of sleeve sections adjustably disposed upon the spherical member, said sleeve sections being threaded upon their upper surface, and a plurality of collars threadably disposed about the sleeve sections adapted to maintain the said sections in fixed relation to the spherical member.

JOHN L. BUCKLEY.